United States Patent
Couleur et al.

(10) Patent No.: US 8,471,545 B2
(45) Date of Patent: Jun. 25, 2013

(54) ELECTRONIC DEVICE AND METHOD FOR DC-DC CONVERSION

(75) Inventors: Michael Couleur, Munich (DE); Lei Liao, Aachen (DE); Christophe Vaucourt, Munich (DE)

(73) Assignee: Texas Instruments Deutschland GmbH, Freising (DE)

( * ) Notice: Subject to any disclaimer, the term of this patent is extended or adjusted under 35 U.S.C. 154(b) by 286 days.

(21) Appl. No.: 12/794,554

(22) Filed: Jun. 4, 2010

(65) Prior Publication Data
US 2010/0308785 A1    Dec. 9, 2010

(30) Foreign Application Priority Data
Jun. 8, 2009    (DE) .......................... 10 2009 024 161

(51) Int. Cl.
*G05F 1/618* (2006.01)
(52) U.S. Cl.
USPC .......................................... 323/289; 323/225
(58) Field of Classification Search
USPC ................. 323/224, 265, 282, 284, 285, 351, 323/225, 271, 289; 327/108, 377, 379, 382, 327/376

See application file for complete search history.

(56) References Cited

U.S. PATENT DOCUMENTS

| | | | | | |
|---|---|---|---|---|---|
| 4,928,053 | A | * | 5/1990 | Sicard et al. | 323/284 |
| 5,410,190 | A | * | 4/1995 | Carobolante | 327/110 |
| 6,967,520 | B2 | * | 11/2005 | Takehara | 327/427 |
| 7,746,153 | B1 | * | 6/2010 | Megaw | 327/390 |
| 2007/0177412 | A1 | | 8/2007 | Sharp | |

FOREIGN PATENT DOCUMENTS

JP    2007288935    1/2007

* cited by examiner

*Primary Examiner* — Gary L Laxton
(74) *Attorney, Agent, or Firm* — William B. Kempler; Wade J. Brady, III; Frederick J. Telecky, Jr.

(57) ABSTRACT

An electronic device is provided for switched DC-DC conversion of an input voltage level into an output voltage level. The electronic device is configured to control a control gate of a power switch and to prevent a charge of a capacitance of the control gate released during a switching operation from flowing to ground.

10 Claims, 4 Drawing Sheets

ELECTRONIC DEVICE AND METHOD FOR DC-DC CONVERSION

CROSS-REFERENCE TO RELATED APPLICATIONS

This patent application claims priority from German Patent Application No. 10 2009 024 161.2, filed Jun. 8, 2009, which is incorporated herein by reference in its entirety. This application is related to co-pending application Ser. No. 12/794,585 (TI-67080) filed on even date which is incorporated herein by reference in its entirety.

FIELD OF THE INVENTION

The invention relates to an electronic device and a method for DC-DC conversion.

BACKGROUND

Integrated switched DC-DC converters (e.g. buck, boost or buck/boost converter) have two main types of power losses. One is due to charging and discharging of the control gate (i.e. the gate capacitance) of the power switches (e.g. power MOSFETs). The control gate typically receives an alternating control voltage that varies between the primary voltage supply level (or a higher voltage level depend on the specific type of converter and its architecture) and ground. The alternating voltage levels on the gate capacitance CG cause an average DC current IDC in the gate driving stage flowing from the primary voltage supply (input voltage VIN) to ground GND. The current IDC can be roughly approximated as:

$$IDC = CG \cdot f \cdot VON \quad (1)$$

where f is the switching frequency. The power consumption POWC due to this effect is then:

$$POWC = CG \cdot f \cdot VON^2 \quad (2)$$

It is proportional to the switching frequency, the gate capacitance CG and the square of the voltage level VON for turning the switch on (high level). IDC can reach several mA, which significantly contributes to the overall power consumption of the DC-DC converter.

The second type of power loss is due to the ON resistance of the power switches. This kind of power loss is resistive and referred to as "RDSON loss". RDSON refers to the resistance of a power switch when a current is flowing through the switch, i.e. when it is turned on. This power loss can be described as:

$$PRES = RDSON \cdot IL^2 \quad (3)$$

where IL is the load current or output current of the DC-DC converter. The first order approximations of the ON resistance RDSON and the control gate capacitance are $$RDSON = \left(\mu \cdot Cox \cdot \frac{W}{L}(Vgs - Vt) - Vds\right)^{-1} \quad (4)$$

and $$CG = Cox \cdot W \cdot L \quad (5)$$

Cox is the gate oxide capacitance per control gate area, µ the mobility of the charge carriers, and W and L the respective width and length of the control gate.

The above equations (2) to (5) show that increasing the dimensions of the power switch (increasing the width W with respect to the length L) may reduce the ON resistance RDSON. Increasing Vgs also decreases the ON resistance RDSON, but this increases POWC as VON is proportional to Vgs. Furthermore, increasing the gate area (W times L) also increases the gate capacitance CG.

This means that a design measure aiming to reduce either of the two power losses POWC or PRES adversely affects the respective other loss.

SUMMARY

It is an object of the invention to provide an electronic device and a method for DC-DC conversion with lower power losses due to a control gate capacitance and an ON resistance of power switches than prior art devices and methods.

Accordingly, an electronic device for switched DC-DC conversion of an input voltage level into an output voltage level is provided. The input voltage level may relate to an input power supply or primary power supply (for example from a battery). The output voltage is also referred to as the secondary power supply and used to supply a load with an output voltage and an output current or load current. The electronic device may be configured to control a control gate of a power switch. The electronic device is advantageously configured to prevent a charge of a capacitance of the control gate released during a switching operation from flowing to ground. The electronic device may be configured to add the charge of a capacitance of the control gate released during a switching operation to an output current of the DC-DC conversion. The charge may at least partially be the charge of a gate capacitance of a power MOSFET used as the power switch. When switching the power switch, the amount of charge on the control gate can change which can result in a current. The charge may be released from the control gate due to switching, for example if the power switch is turned off. According to this aspect of the invention, the control gate of the power switch may not directly be coupled to ground for turning the switch off. The charge may be fed to a node, where it can contribute to the load current rather than directly flowing to ground. The released charge is then reused to power the load and losses are reduced.

In a further aspect of the invention, the electronic device (e.g. the driving stage of the electronic device) may comprise a charge pump for generating a first control voltage level for the control gate of the power switch. The first control voltage level may advantageously be greater than the input voltage level (primary power supply) and/or the output voltage level (secondary power supply). Raising the control voltage level of the power switch (e.g. a power MOSFET) decreases the ON resistance and reduces the resistive power losses. However, increasing the control voltage level also increases power consumption due to charging and discharging of the control gate (the capacitance of the control gate).

The electronic device may be configured to switch the control gate from the first control voltage level to the output voltage level. The electronic device may then be adapted to connect the control gate temporarily to an output node. The output node may provide the secondary power supply. This means that the output node can be temporarily coupled to the control gate of the power switch and that the control gate receives temporarily the output voltage level which may then be lower than the first control voltage level.

In an aspect of the invention, the charge pump may comprise a flying capacitor. The capacitance value of the flying capacitor may then be dimensioned to be x times greater than the capacitance value of the gate capacitance of the low side switch. The parameter x can then be much greater than 1. If the flying capacitor is dimensioned according to this aspect of the invention, the efficiency of the DC-DC conversion can be optimized.

The charge pump may be configured to switch one side of the flying capacitor between the input voltage level and the output voltage level of the DC-DC converter. The other side of the flying capacitor may then assume a maximum voltage level of about two times the input voltage level minus one time the output voltage level. The output voltage level may here be lower than the input voltage level as for example in a buck converter. Varying the voltage between the input voltage level and the output voltage level in the charge pump is much more efficient than varying between the input voltage level and ground as conventional charge pumps operate. The charge pump may comprise two inverters. A first inverter may be coupled to pull on one side of the flying capacitor either to the input voltage level or to the output voltage level. The second inverter may be coupled to pull the control gate of the power switch either to the first control voltage level or to the output voltage level. A switch of the second inverter may be configured to couple the control gate of the power switch temporarily to an output node of the DC-DC converter during the process of turning off the power switch for applying the output voltage level to the control gate during a first phase of switching the power switch off. The switch of the charge pump may then serve as a first auxiliary switch. A second auxiliary switch may then be provided and configured to pull the control gate of the power switch to ground for completely turning the switch off. The first and the second auxiliary switch may then alternately be turned on in two subsequent phases of a process during which the power switch is turned off. This provides that the charge pump is configured to apply the respective voltage levels to the control gate of the power switch and operates between the input voltage level and the output voltage level. This is a very efficient manner of driving the control gate of the power switch.

In an embodiment, the electronic device may be configured to switch a high side switch and/or a low side switch of the DC-DC converter. The high side switch may be a power MOSFET and the low side switch may also be a power MOSFET. The high side switch can be implemented with an NMOS transistor or a PMOS transistor. The low side switch usually is an NMOS transistor. The invention may then advantageously be applied to the low side switch. The high side switch can be coupled to the primary supply voltage, i.e. to the input voltage level. The low side switch can be coupled to ground. The DC-DC converter may have a switching node between the high side switch and the low side switch. The switching node may then be coupled to an inductor. The power switches (high side and low side) may then alternately switched on and off (e.g. with alternating non-overlapping clock signals) for controlling a current through the inductor and generating the output voltage on the other side of the inductor. The electronic device may then include a control stage for controlling duty cycles and/or clock periods of the clock signals for the power switches for controlling an output current (e.g. current through the inductor) and/or the output voltage level. The electronic device may be operated in a current mode, in a voltage mode, or in both and respective current and/or voltage sensing means may be implemented.

The invention advantageously applies to a buck converter. Buck converters have a lower output voltage level than input voltage level. The control gate may then be raised even above the input voltage level for switching the power switch on. For turning the power switch towards an off state (not conducting), the control gate may—at least temporarily—be coupled to receive the output voltage level. In an embodiment, the power switch may be a low side power MOS field effect transistor (MOSFET; e.g. NMOS). The control gate of the MOSFET may then be coupled to be switched from the first control voltage level to the output voltage level in a first phase and from the output voltage level to ground in a second phase. This provides that at least a part of the charge that is due to the high initial control voltage level can be re-circulated into the load current.

The electronic device may comprise a first auxiliary switch coupled between the control gate and an output node. There may be a second auxiliary switch coupled between the control gate of the power switch and ground. The electronic device may then be configured to switch the control gate from the first control voltage level to the output voltage level in a first phase and from the output voltage level to ground in a second phase. The second phase may follow the first phase. This provides that the control gate of the power switch can reliably be discharged with low losses.

The invention also provides a method of operating a DC-DC converter. A first control voltage level may be applied to a control gate of a power switch so as to reduce an ON resistance of the power switch during a conducting phase of the switch. A charge from the control gate of the power switch may then be redirected so as to add to an output current of the DC-DC converter while turning the power switch off. A charge that is released from the control gate of the power switch when the power switch is turned off may be fed to an output node instead of feeding the released charge to ground. Further aspects and steps of the method can be derived from the description of the electronic device and the preferred embodiments of the invention.

BRIEF DESCRIPTION OF DRAWINGS

Further aspects of the invention will ensue from the following description of preferred embodiments of the invention with reference to the accompanying drawings wherein.

DETAILED DESCRIPTION OF EXAMPLE EMBODIMENTS

Figure 1:
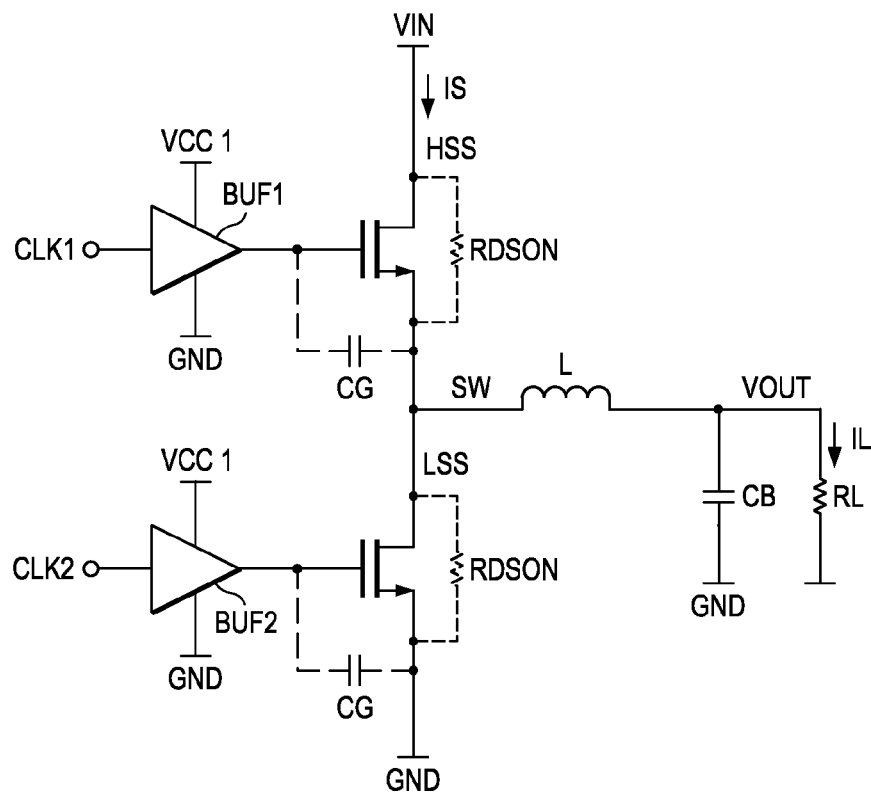
FIG. 1 shows a simplified circuit diagram of a prior art DC-DC converter.

FIG. 1 is a simplified circuit diagram of DC-DC converter according to the prior art. Only the most important components of a DC-DC converter are shown. There is a high side switch HSS and a low side switch LSS. The switches can be implemented as PMOS and NMOS transistors. In this embodiment, both switches are NMOS transistors. The high side switch HSS receives a first clock signal CLK1 through a first buffer BUF1. The low side switch LSS receives a second clock signal CLK2 through a second buffer BUF2. Instead of buffers BUF1, BUF2, inverters may be used. The clock signals CLK1, CLK2 may be non-overlapping clock signals. The clock or driving signals CLK1, CLK2 may be pulse width modulated (PWM) signals. The high side switch is coupled to VIN. The low side switch LSS is coupled at a switching node SW to the high side switch HSS and with the other side to ground. An inductor L is also coupled to the switching node SW. If the high side switch HSS and the low side switch LSS are alternately switched on and off, the switching node SW is either pulled towards the input voltage level VIN or towards ground GND. This produces a rising and falling current through the inductor that charges the buffer capacitor CB and establishes an output voltage VOUT. From the output node VOUT a load current IL flows through a load RL.

The power switches HSS and LSS have an inherent finite ON resistance RDSON and an inherent control gate capacitances CG (shown with dashed lines) which can cause the above mentioned undesired power losses POWC and PRES (equations (2) and (3)) through buffers BUF1 and BUF2, which have supply voltage levels VCC1, and ground GND and VCC2 and ground GND respectively.

Figure 2:
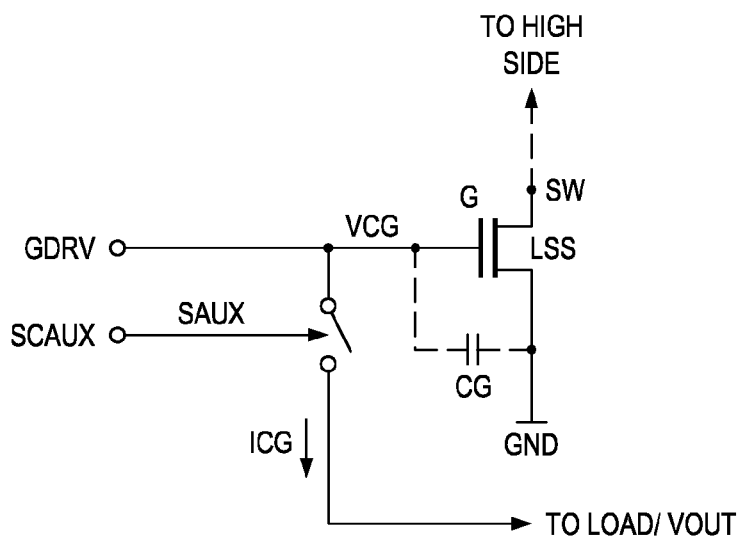
FIG. 2 shows a simplified circuit diagram of an aspect of the invention.

FIG. 2 is a simplified circuit diagram showing an aspect of the invention. A low side switch LSS of a DC-DC converter is driven with a gate driving signal GDRV (e.g. a periodic clock signal or a PWM signal with a frequency f and a specific duty cycle) on its control gate G. The control voltage level of the gate driving signal is VCG. An auxiliary switch SAUX is provided and controlled with auxiliary control signal SCAUX. The power switch LSS may now be turned on, by applying a high voltage level VCG so as to reduce the ON resistance RDSON of the power switch. When the power switch LSS is turned off, a charge may be released from control gate G. The released charge can be a charge due the parasitic gate capacitance CG (indicated with dashed lines). Auxiliary control signal SCAUX may now bring the auxiliary switch SAUX in a conducting state. The input node GDRV may simultaneously be brought in a high impedance state or be decoupled to prevent charge from flowing back. The released charge flows through switch SAUX so as to be added to a supply current. The released and flowing charge from the control gate is indicated as current ICG which finally contributes to the load current IL. This means that the charge (or a certain part of the charge) of the control gate is used for powering a load RL instead of directly flowing to ground. In other words, a certain amount of charge from the control gate is directed through the load RL before it reaches ground.

Figure 3:
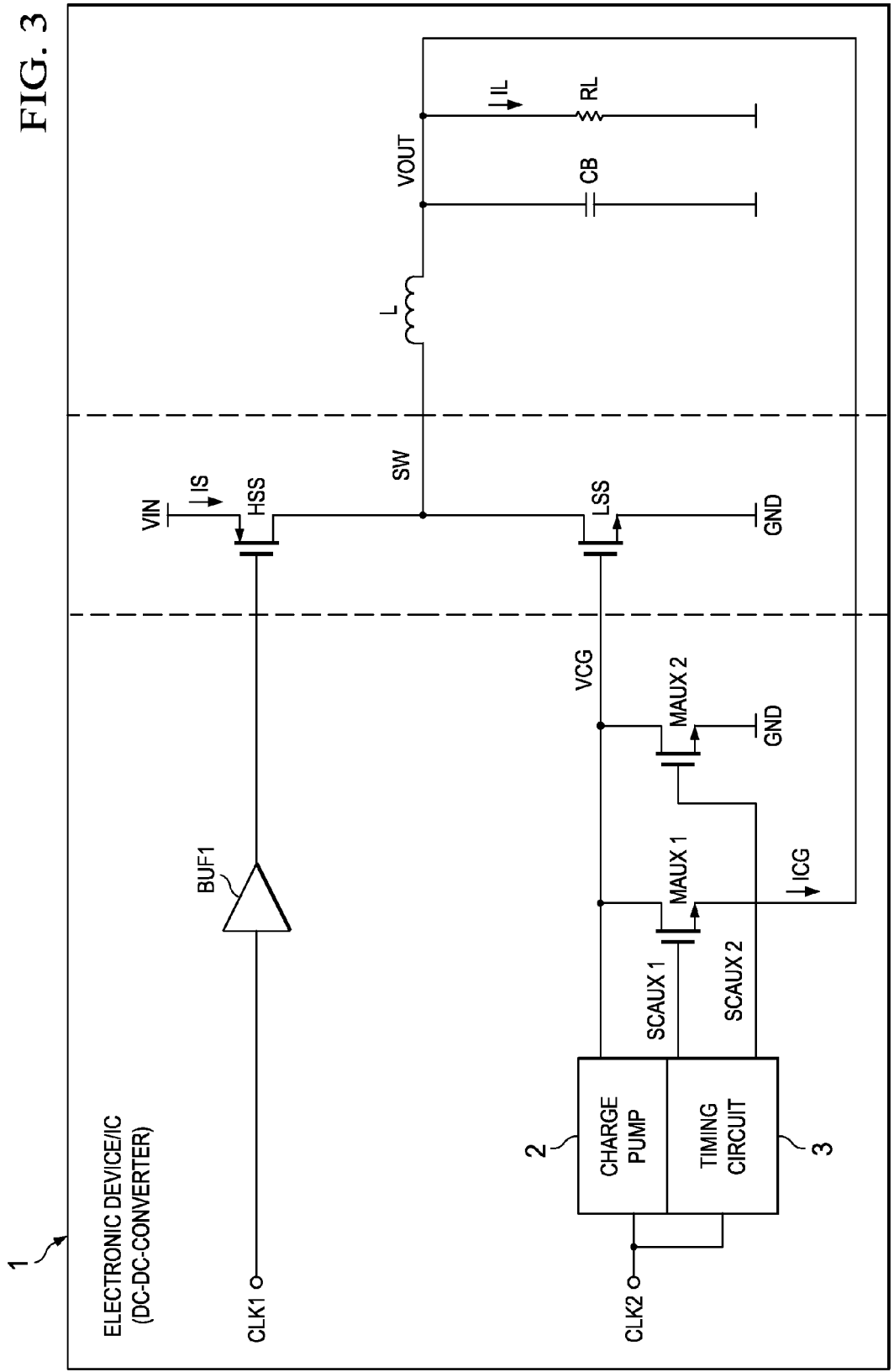
FIG. 3 shows a simplified circuit diagram of an embodiment of the invention.

FIG. 3 shows a simplified circuit diagram of an embodiment of the invention. The electronic device 1 may include components which are integrated in an integrated semiconductor device (IC). Other components may be externally coupled with this integrated circuit. The dashed lines suggest different configurations for integrated and external components, but the invention is not limited to any of those configurations. An embodiment of an integrated circuit IC may include the control stages for the DC-DC conversion and the driving stages BUF, as well as the charge pump 2 or charge pumps 2, 3 and the auxiliary switch MAUX. The high side and/or low side switch can be integrated or external as well as the inductor L, the buffer capacitor CB and the load RL.

The electronic device 1 may also include control loops for controlling the inductor current through the inductor L and the level of the output voltage VOUT. The control mechanisms are not shown. The control of the output voltage level and the control of the magnitude of the inductor current may then be performed through duty cycles and/or the switching frequency of the driving signals CLK1, CLK2 for the power switches HSS, LSS.

In this embodiment, the high side switch HSS may be driven with a driving clock CLK1 which is applied to the control gate of HSS through a buffer BUF. The low side switch LSS is controlled according to aspects of the invention. The second clock signal CLK2 for driving the low side switch is applied to a charge pump 2. The charge pump 2 generates a control voltage VCG. The control voltage VCG has a first control voltage level which is used for turning the low side switch LSS on. The first control voltage level can be higher than the input voltage VIN and/or the output voltage VOUT. This reduces the ON resistance RDSON of the low side switch and therefore reduces the resistive power losses (equation (3)) during the ON phases of low side switch LSS. An increase of the power consumption due to the increased control voltage level VCG is avoided with auxiliary switches MAUX1, MAUX2 and the timing circuit 3. Timing circuit 3 performs timing and pulse generation in response to the driving signal CLK2 and provides control signals SCAUX1 and SCAUX2 for switches MAUX1 and MAUX2 respectively. In order to switch the low side switch LSS off, the control voltage level VCG is to be lowered. According to an aspect of the invention, this can be performed in two phases. In a first phase, the control gate of low side switch LSS is coupled through the first auxiliary switch MAUX1 to the output node VOUT. This provides that the output voltage level VOUT is applied to the gate of low side switch LSS. The output voltage level VOUT can be lower than the first control voltage level to which the gate of LSS has been previously charged. This provides that a certain amount of charge is released from the gate capacitance. This charge flows as a current ICG through auxiliary switch MAUX1 to VOUT. The charge contributes as current ICG to the load current IL. In a second phase, the second auxiliary switch MAUX2 is switched on and the gate of the low side switch LSS is coupled to ground. Only the remaining charge (being stored on the control gate of LSS when the control voltage level VCG is at the output voltage level VOUT) directly flows to ground. Therefore, a certain amount of charge (for example the amount due to an increased control voltage level) on the control gate contributes to the supply current IL. Power consumption PRES due to RDSON may therefore be reduced without necessarily increasing POWC by the same amount.

Figure 4:
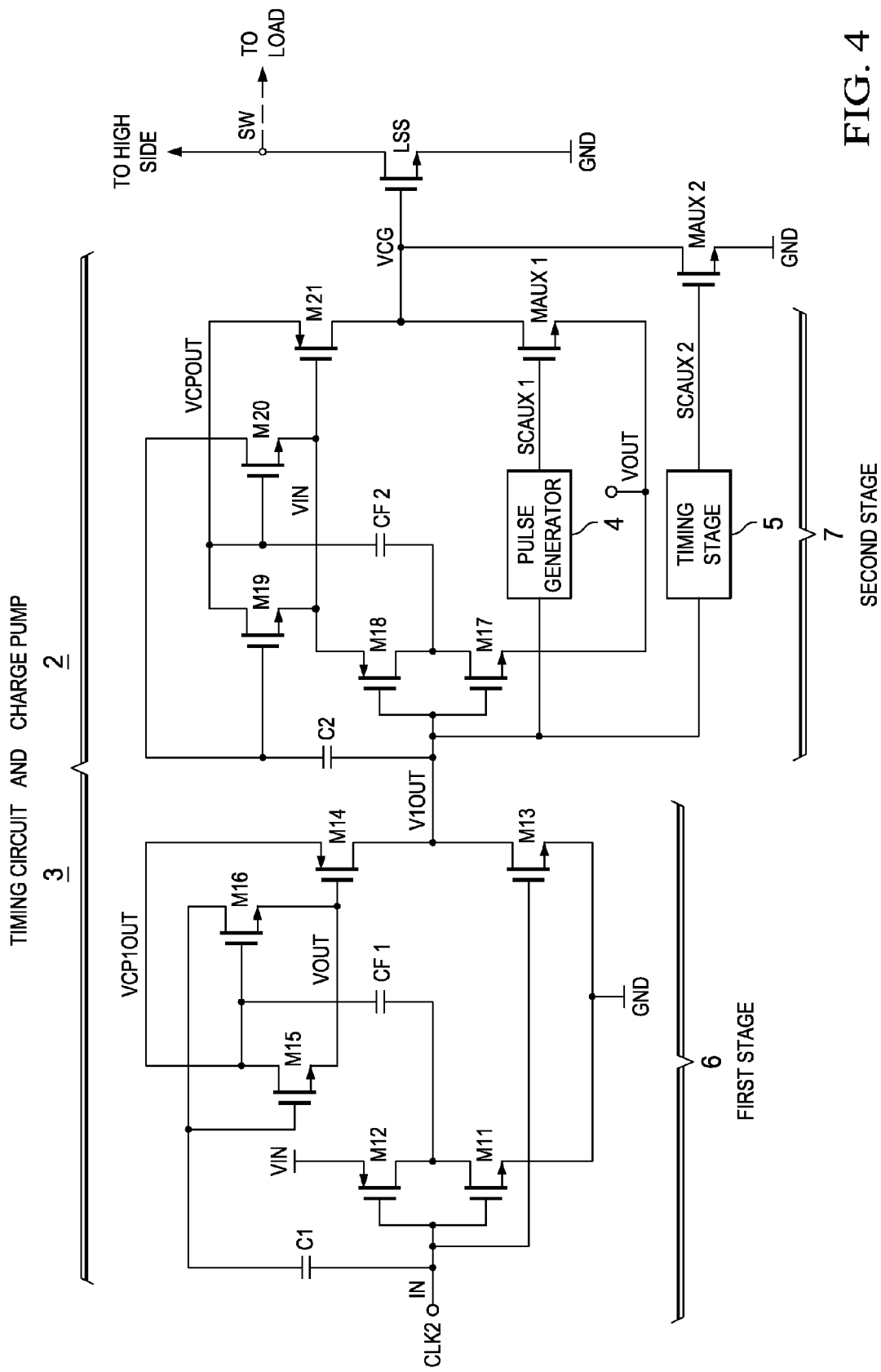
FIG. 4 shows a simplified circuit diagram of an embodiment of the invention.

FIG. 4 shows a simplified circuit diagram of an embodiment of the invention. The embodiment shows the charge pump 2 and the timing stage 3 of FIG. 3 in more detail. The charge pump includes a first stage 6 and a second stage 7. The first stage includes a first flying capacitor CF1 and a capacitor C1. The input of the inverter including transistors M11, M12 receives the clock signal CLK2 at input node CLK2. The output of the inverter M11, M12 is coupled to a first side of capacitor CF1. The first side of the first flying capacitor CF1 can alternately be pulled towards the input voltage level VIN or to ground GND through transistors M11, M12 and in response to the input signal CLK2. The second side of the flying capacitor CF1 is either charged through transistor M15 or discharged through transistor M14. The control gate of transistor M15 is coupled to the second side of capacitor C1. The first side of capacitor C1 is coupled to the input node IN and also receives the input signal CLK2. The voltage at the control gate of M15 is increased to a higher voltage level so as to turn the transistor on. The gate of transistor M14 is coupled to the output node VOUT. As M14 is a PMOS transistor, it does not require an overdrive voltage at its control gate. Capacitor C1 is charged through transistor M16, the gate of which is also coupled to the second side of the first flying capacitor CF1. If the first side of the first flying capacitor CF1 is pull up through transistor M12 to VIN, the second side of the flying capacitor CF1 can reach a voltage level VCP1OUT which can be about VIN+VOUT. The output voltage V1OUT of the first stage can be a little bit lower than VCP1OUT. The second stage 7 includes transistors M17 to M21, a second flying capacitor CF2 and another capacitor C2. The second stage 7 operates basically similar to the first stage 6, but the voltage level VCPOUT at the second side of the second capacitor can reach a maximum voltage level of about two times the input voltage level VIN minus one time the output voltage level VOUT (2VIN-VOUT). The control gate of the low side switch LSS is coupled to VCPOUT through transistor M21. The charge pump is configured to vary the control voltage level at the control gate of the low side switch LSS between VCPOUT and VOUT. The first side of the second flying capacitor CF2 is coupled to the inverter including transistors M18, M17 and alternately pulled to the input voltage level VIN or to VOUT. This means that this node (sources of transistors M17 and MAUX1) of the charge pump is coupled to receive the output voltage level VOUT of the DC-DC converter. The second stage 7 of the charge pump is configured to operate between VIN and VOUT rather than VIN and ground GND. This provides additional effectiveness. The second side of the second flying capacitor CF2 is either recharged through transistor M19 to the input voltage level VIN or it is pulled up to about two times VIN minus one time VOUT and discharged through M21. The gate of M19 is coupled to the second side of C2. V1OUT is applied to the first side of C2. Transistor M20 charges the second side of C2. The gate of M20 is coupled to the second side of CF2.

There is further a pulse generator 4. The pulse generator is configured to generate pulses of a specific period. The pulse length is dimensioned to be shorter than the full duration of a high pulse of signal V1OUT. This is the high pulse duration of clock signal CLK2. The pulses output by the pulse generator 4 are fed to the control gate of the first auxiliary switch MAUX1. The first auxiliary switch MAUX1 is coupled between node VCG to which a control gate of a low side power switch LSS can be coupled. In response a pulse from pulse generator 4, the first auxiliary switch MAUX1 turns on, when the low side switch LSS is to be turned off. The charge released from the gate capacitance of the low side switch is then fed to output node VOUT. After a short first pulse, the first auxiliary switch MAUX1 is closed and the second auxiliary switch MAUX2 is turned on. Therefore, another timing stage 5 is coupled to receive signal V1OUT and provide a control signal to the control gate of the second auxiliary switch MAUX2. The second auxiliary switch is coupled between node VCG and ground GND. This provides that the low side switch is completely turned off, when the second auxiliary switch MAUX2 is turned on. However, only the charge released during the second phase, when MAUX2 is turned on is lost to ground GND. A certain amount of charge is fed to the output node and added to the load current IL during the first phase, when only MAUX1 is turned on and the second switch is still off.

Figure 5:
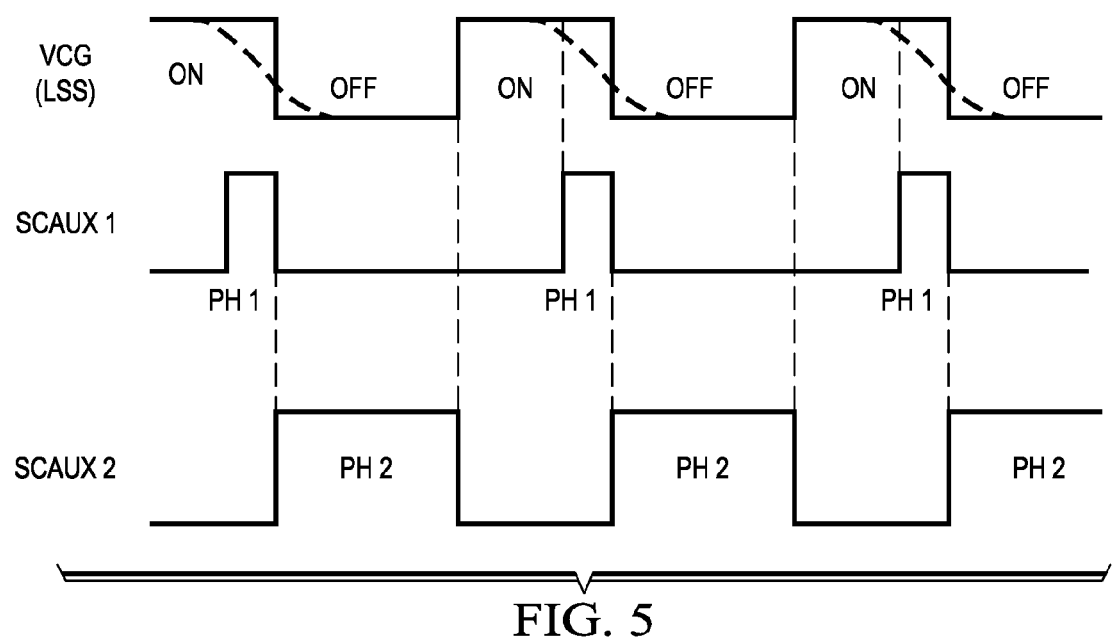
FIG. 5 shows waveforms of signals of the embodiments of the invention.

FIG. 5 shows a simplified diagram of control signals for the gates of the low side switch LSS (VCG), the first auxiliary switch MAUX1 (SCAUX1) and the second auxiliary switch MAUX2 (SCAUX2). The low side switch is turned on and off by alternating the gate voltage between a high voltage level from the charge pump and ground. The falling edges of the control signal VCG are also shown with dashed lines in a stretched manner (not realistic) in order to illustrate the two phases PH1, PH2 of turning off the low side switch LSS. In a first phase PH1, the first auxiliary switch MAUX1 is turned on, i.e. the gate signal SCAUX1 is high. During this first phase PH1, the gate of the low side switch is coupled to VOUT and starts turning off. LSS is turned off to a degree, which depends on various factors as for example the output voltage level. However, the charge released from the gate capacitance of the low side switch flows to the output node and not to ground. In order to turn the low side switch LSS completely off, the second auxiliary switch MAUX2 is turned on during a second phase PH2 that follows the first phase PH1. During the second phase, the second auxiliary switch MAUX2 pulls the gate of the low side switch to ground. The second phase PH2 ends when LSS is to be turned on again.

According to an aspect of the invention the embodiments of the invention can be dimensioned in order to increase the efficiency of the circuit. The capacitance value CF2 of the flying capacitor may be dimensioned to be x times the parasitic capacitance value CG of the high side switch. Due to charge conservation between the flying capacitor and the parasitic capacitor, the following relationship can be assumed:

$$x \cdot CG \cdot (VIN - VOUT) = x \cdot CG \cdot (V' - VIN) + CG \cdot V' \quad (6)$$

where V' is the voltage shared by the flying capacitor CF2 and the gate capacitance CG. This can be used to find a term for V' as a function of x, VOUT and VIN:

$$V' = \frac{x}{x+1} \cdot (2 \cdot VIN + VOUT) \quad (7)$$

The charge lost by the flying capacitor CF during operation is then:

$$\Delta Q = CG \cdot V' = \frac{x}{x+1} \cdot CG \cdot (2 \cdot VIN + VOUT) \quad (8)$$

The current I required to recharge the flying capacitor CF is then $$I = \Delta Q \cdot f = \frac{x}{x-1} \cdot CG \cdot (2 \cdot VIN + VOUT) \cdot f \quad (9)$$

The required power P for recharging the flying capacitor CF is:

$$P = \frac{x}{x+1} \cdot CG \cdot VIN \cdot (2 \cdot VIN + VOUT) \cdot f \quad (10)$$

The corresponding energy E is given as $$E = \frac{x}{x+1} \cdot CG \cdot VIN \cdot (2 \cdot VIN + VOUT) \quad (11)$$

The effectiveness EFF is the ratio of the energy ECG stored in the gate capacitance and E the energy required to recharge the gate $$EFF = \frac{ECG}{E} \quad (12)$$

$$= \frac{\frac{1}{2} \cdot 1 \cdot CG \cdot V'^2}{\frac{x}{x+1} \cdot CG \cdot VIN \cdot (2 \cdot VIN + VOUT)}$$

$$= \frac{1}{2} \frac{x}{x+1} \cdot \left( \frac{2 \cdot VIN + VOUT}{VIN} \right)$$

The effectiveness EFFCONV of a conventional DC-DC converter, where the control gate of the low side switch is coupled to ground, has the effectiveness $$EFFCONV = \frac{ECG}{E} = \frac{\frac{1}{2} \cdot CG \cdot VIN^2}{CG \cdot VIN^2} = \frac{1}{2} \quad (13)$$

According to this aspect of the invention, the flying capacitor CF2 and the gate capacitance CG can be dimensioned with respect to each other so as to optimize x. Furthermore, the values of VOUT and VIN are also relevant for the achievable gate driver effectiveness and therefore for the achievable converter effectiveness. Parameter x should be much greater than 1. This means that the flying capacitor CF2 should have a much larger capacitance value than the gate capacitance CG (x>>1; CF2>>CG).

Although the embodiments are primarily described with respect to a buck converter, the same principles may be applied to other types of converters. For different embodiments of the invention, it can be necessary to exchange the respective voltage levels (e.g. VIN and VOUT) and/or transistor types (e.g. NMOS with PMOS or vice versa). Although the invention has been described hereinabove with reference to specific embodiments, it is not limited to these embodiments and no doubt further alternatives will occur to the skilled person that lie within the scope of the invention as claimed.

The invention claimed is:

1. An electronic device for switched DC-DC conversion of an input voltage level into an output voltage level having a high side transistor in series with the low side transistor, wherein the electronic device is configured to control a control gate of the low side transistor and to prevent a charge of a gate to source capacitance of the control gate released during a switching operation from flowing to ground;
   a first auxiliary switch coupled between the control gate and an output node and a second auxiliary switch coupled between the control gate of the low side transistor and ground, wherein the electronic device is configured to switch the control gate from a first control voltage level to the output voltage level in a first phase and from the output voltage level to ground in a second phase.

2. The electronic device according to claim 1, being further configured to add the released charge to an output current of the DC-DC conversion.

3. The electronic device according to claim 2, further comprising a charge pump for providing a first control voltage level for the control gate of the low side transistor so as to reduce an ON resistance of the power switch.

4. The electronic device according to claim 2, further comprising a first auxiliary switch coupled between the control gate and an output node and a second auxiliary switch coupled between the control gate of the low side transistor and ground, wherein the electronic device is configured to switch the control gate from a first control voltage level to the output voltage level in a first phase and from the output voltage level to ground in a second phase.

5. The electronic device according to claim 3, further comprising a first auxiliary switch coupled between the control gate and an output node and a second auxiliary switch coupled between the control gate of the power switch and ground, wherein the electronic device is configured to switch the control gate from the first control voltage level to the output voltage level in a first phase and from the output voltage level to ground in a second phase.

6. The electronic device according to claim 1, further comprising a charge pump for providing a first control voltage level for the control gate of the low side transistor so as to reduce an ON resistance of the power switch.

7. The electronic device according to claim 6, further comprising a first auxiliary switch coupled between the control gate and an output node and a second auxiliary switch coupled between the control gate of the power switch and ground, wherein the electronic device is configured to switch the control gate from the first control voltage level to the output voltage level in a first phase and from the output voltage level to ground in a second phase.

8. A DC-DC converter having a high side transistor in series with a low side transistor and a control circuit driving a switched low side transistor having a parasitic gate capacitance between its gate and source comprising:
   a first auxiliary switch coupled to the gate capacitance for coupling at least a portion of charge stored in the gate capacitance to an output of the DC-DC converter when the switched output transistor is to be turned off; and
   a second auxiliary switch coupled between the gate capacitance and a reference voltage for completing discharge of the gate capacitance to turn the switched output transistor off.

9. The DC-DC converter of claim 8 further comprising a charge pump for driving a gate of the switched output transistor.

10. The DC-DC converter of claim 8 wherein the converter is a buck converter.

* * * * *